United States Patent [19]

Margulies

[11] 4,146,985

[45] Apr. 3, 1979

[54] X-RAY FILM MOUNTS

[75] Inventor: Herman Margulies, Millburn, N.J.

[73] Assignee: Sterling Drug, Inc., New York, N.Y.

[21] Appl. No.: 805,926

[22] Filed: Jun. 13, 1977

[51] Int. Cl.² .............................................. G09F 1/10
[52] U.S. Cl. .................................... 40/158 B; 40/537
[58] Field of Search ...................... 40/152, 154, 158 B, 40/10, 158, 489, 537

[56] References Cited

U.S. PATENT DOCUMENTS

| | | | |
|---|---|---|---|
| 1,378,709 | 5/1921 | Martin | 40/158 B |
| 1,381,674 | 6/1921 | Simpson | 40/158 B |
| 1,474,174 | 11/1923 | Segall | 40/158 B |
| 1,853,197 | 4/1932 | Bosworth | 40/158 B |
| 2,336,196 | 12/1943 | Sparling | 40/154 X |
| 3,996,683 | 12/1976 | Hanke | 40/158 B |

*Primary Examiner*—Russell R. Kinsey
*Assistant Examiner*—Wenceslao J. Contreras
*Attorney, Agent, or Firm*—Charles R. Fay

[57] ABSTRACT

A holder for X-ray films comprising a sheet of very thin material having a series of rectangular openings therein, each opening being surrounded by a depressed continuous flange below the plane of the sheet, and a discontinuous flange generally in the plane of the sheet of material, said discontinuous flange comprising four separate non-flexible lips or tabs extending for the major portion of the lengths of the respective sides into the rectangles in which they are located.

5 Claims, 3 Drawing Figures

X-RAY FILM MOUNTS

BACKGROUND OF THE INVENTION

The prior art provides various holders for mounting dental X-ray film, photographic slides or photographs. Thus Gould et al. U.S. Pat. No. 3,279,112 and Sakamoto U.S. Pat. No. 3,543,426 describe film holders which require that the film be mounted in the holders by sliding the film into the latter so that holding tabs override the upper surface of the film as it slides into the holding window. Lieberman U.S. Pat. No. 3,069,795 and Sharp U.S. Pat. No. 3,921,322 provide film mounts having broad holding flanges, and the loading of film into display windows requires that the film be flexed substantially in order to permit engagement of the film behind the holding flanges. Film mounts described by Greene et al. U.S. Pat. No. 2,842,882 are so designed that loading of film requires deformation of the mounts so as to free up holding tabs which serve to hold the film in place on the mounts along all four edges of the film. Bosworth U.S. Pat. No. 1,853,197 describes a film mount that necessitates stapling each piece of film to the mount after the engagement of one edge of the film under a holding tab. Winslow U.S. Pat. No. 2,614,354 describes a picture mount which requires the use of two holding plates which serve to maintain a picture held between them in a sandwich fashion. Gwin U.S. Pat. No. 3,195,258 provides a holder which engages photographic slides by the lateral displacement of flexible ribs. The holder is chiefly adaptable to holding photographic slides, and on return of the ribs to their normal unflexed position after loading of a film slide, would tend to distort any unstiffened film material such as dental X-rays.

Thus the film holders provided by the prior art either require an undesirable manipulation of either the film mounts themselves or the film, or it provides picture holding concepts which are entirely unsuited to the mounting and display of X-ray film.

The film mounts provided by the present invention avoid the problems indicated above encountered by the prior art mounts in that the loading of the mounts with X-ray film eliminates entirely manipulation of the mounts themselves and minimizes manipulation of the film to be mounted. In accordance with the present invention, the X-ray film are simply snapped into the mounts by the application of gentle finger pressure, an operation which involves only very slight flexure of the film. In addition the mounts provided by the instant invention provide a larger display window for maximum viewing exposure of the X-ray film.

SUMMARY OF THE INVENTION

The X-ray film mount of the present invention comprises a flat sheet of very thin relatively stiff material. This sheet is provided with a plurality of rectangular openings therein for the reception of the individual X-ray films. Each opening is provided with a depressed continuous very narrow lip extending about the respective opening below the plane of the sheet of material and this continuous lip holds the film in the opening at the bottom. This lip is extremely narrow and provides for the greatest exposure of the film that is possible in a device of this nature.

Generally in the plane of the sheet of material there are provided non-flexible lips or tabs in the nature of flanges which are discontinuous at the corners of the openings but extend in each case a major portion of the length of the respective side of the opening.

To insert the film in an opening it is merely necessary to lay the film on the four tabs or lips, and then to give the film a very slight downward pressure with the finger tips in order to snap the film past the non-flexible lips and to place the film on the aforesaid continuous flange below the plane of the sheet of the material, and under the four lips lying generally in the plane of the sheet of material, it being recognized that the lips extend into the opening to a lesser degree than the underlying flange and do not obscure the films in any way. By this means, only very slight flexing of the films is required to set them in place, held in their openings.

PREFERRED EMBODIMENT OF THE INVENTION

Figure 1:
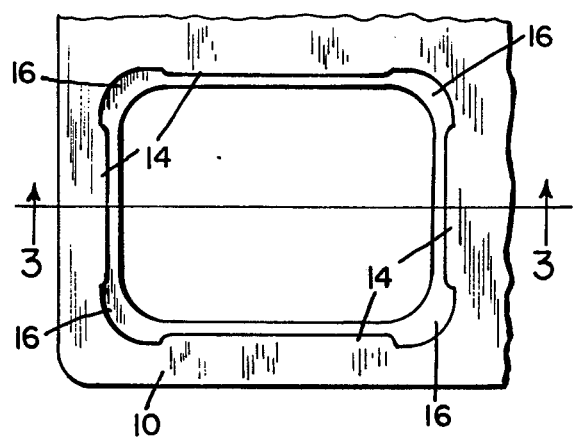
FIG. 1 is a view in elevation illustrating the new film holder at the top side thereof.

The reference numeral 10 refers to a sheet of material which may be of very thin plastic, paper, cardboard or the like. In general, X-ray film mounts are well-known and they assume any size or shape which is convenient, reference being made to U.S. Pat. No. 3,279,112 in this respect showing one way of placing the openings to receive the films for convenience in viewing.

Figure 2:
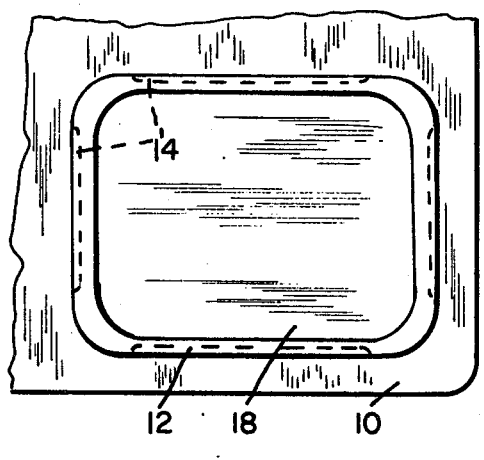
FIG. 2 is a partial view showing a bottom plan view thereof.
Figure 3:
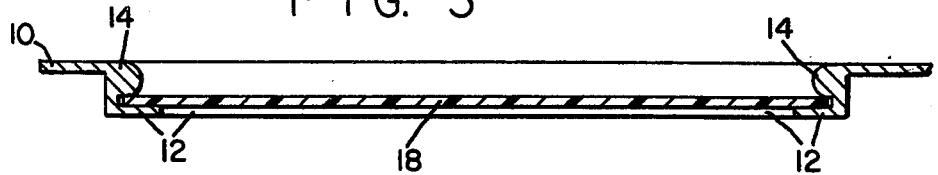
FIG. 3 is a section on an enlarged scale on line 3—3 of FIG. 1.

The present invention is directed to the construction of the means to hold the films, such as dental X-ray film, and as the openings are alike only one has been disclosed. This opening is shown at its top surface in FIG. 1, and its bottom surface is shown in FIG. 2, FIG. 3 being a cross section across the opening in FIG. 1. It is pointed out that in FIG. 1 the film has been omitted for clarity, but is shown in place in FIG. 2.

Each rectangular opening is provided with a depression forming a continuous rectangular rim generally indicated at 12. This rim is shown in FIG. 3 on an enlarged scale, and it is emphasized that this rim forms a continuous flange which extends only very slightly into the opening.

In the plane of the sheet 10 there are outstanding, non-flexible lips or tabs 14. There are four of these, one at each side and one at each end of the rectangular opening, and it is important to note that these lips, unlike flange 12, are not continuous, leaving corner openings 16 without any tab or lip. The tabs or lips 14 do not extend into the rectangular opening to the extent that the continuous flange does, and the four lips form a discontinuous flange generally in the plane of the sheet 10, spaced but parallel to flange 12.

The film 18 lies held against the continuous flange 12, see FIG. 3, and is snapped onto it by snapping the edges of the film past the four non-flexible lips or tabs 14. The flange 12 is made to be slightly smaller in opening area than the film and slightly larger than the opening area which is defined by lips or tabs 14,14.

The parts are so proportioned and the flange 12 and lips 14 are so small, that only a very narrow edge of the film is obscured in any way, lips 14 being shorter and defining a larger opening than flange 12.

To place the X-ray film into each individual window or opening of the X-ray mount, the film is simply placed on the lips 14, which comprise a larger opening than the opening defined by flange 12, and then the fingers of the user are merely used to press down on the film in the area of the lips. The film snaps down immediately and is held on flange 12 by lips 14.

It is also easier to extract the film from the film mount should this be desired.

I claim:

1. A mount for X-ray films comprising a sheet of material having an opening therein, a depression about the edges of said opening, said depression including an inwardly directed flange forming a smaller window below the plane of the sheet, a series of elongated, non-flexible lips in the plane of the sheet of material extending into said opening, but terminating short of the edges of the flange, said lips being peripherally spaced about said opening at each of the four sides thereof and extending into said opening to a lesser degree than does the depressed flange aforesaid, the elongated lips forming a co-planar discontinuous flange parallel to the depressed flange, and having forward edges which are rounded along their length and are parallel to the edges of and facing said opening to thereby offer a cam surface to film being inserted into the opening.

2. The X-ray film mount of claim 1 wherein said lower flange and upper lips form partial end and side pockets for receiving and holding the film.

3. The X-ray film mount of claim 2 wherein the mount is made of plastic.

4. The X-ray film mount of claim 1 wherein the edges of said opening are generally rectilinear.

5. The X-ray film mount of claim 4 wherein the rounded forward edges of said non-flexible lips are substantially surfaces of revolution having their axes parallel to the respective edges of the opening.

* * * * *